(12) United States Patent
Chen (10) Patent No.: US 7,509,508 B2
(45) Date of Patent: Mar. 24, 2009

(54) SIGNAL TRANSMISSION APPARATUS FOR EXTERNAL ELECTRONIC DEVICES

(75) Inventor: Michael Chen, Taipei Hsien (TW)

(73) Assignee: Topower Computer Industrial Co., Ltd., Xindian, Taipei Hsien (TW)

( * ) Notice: Subject to any disclaimer, the term of this patent is extended or adjusted under 35 U.S.C. 154(b) by 406 days.

(21) Appl. No.: 11/200,208

(22) Filed: Aug. 10, 2005

(65) Prior Publication Data

US 2007/0067515 A1    Mar. 22, 2007

(51) Int. Cl.
*G09G 5/00*    (2006.01)

(52) U.S. Cl. .................. 713/300; 439/638; 439/492; 439/493; 439/494; 439/495; 439/496; 439/497; 439/498; 439/499

(58) Field of Classification Search .................. 713/300; 439/638, 492–499
See application file for complete search history.

(56) References Cited

U.S. PATENT DOCUMENTS 6,098,127 A * 8/2000 Kwang ........................ 710/62
6,114,632 A * 9/2000 Planas et al. ............. 174/117 R
6,361,372 B1 * 3/2002 Chiang ........................ 439/680
6,574,741 B1 * 6/2003 Fujimori et al. ............. 713/330
7,212,921 B2 * 5/2007 Jeerage et al. ............... 701/214
2005/0200998 A1 * 9/2005 Rowan ........................ 360/69

FOREIGN PATENT DOCUMENTS

| TW | M242774 U | 9/1993 |
|----|-----------|--------|
| TW | M245516 U | 10/1993 |

* cited by examiner

*Primary Examiner*—Abdelmoniem Elamin
(74) *Attorney, Agent, or Firm*—Muncy, Geissler, Olds & Lowe PLLC (57) ABSTRACT

A signal transmission apparatus for external electronic devices is located on and coupled with a power supply. One end of the signal transmission apparatus that is coupled with the power supply is connected to a control signal input and output unit through a signal transmission line. The opposite end has a plug to connect to an external electronic device. Through the line integration of the signal transmission apparatus, an electric and signal transmission line can be directly connected to the external electronic device to provide required electricity and control signals.

14 Claims, 8 Drawing Sheets

SIGNAL TRANSMISSION APPARATUS FOR EXTERNAL ELECTRONIC DEVICES

FIELD OF THE INVENTION

The present invention relates to a signal transmission apparatus for external electronic devices and particularly to a signal transmission apparatus that integrates electricity and control signal on the same cable through at least one connection port for external electronic devices.

BACKGROUND OF THE INVENTION

With computer related equipment advanced rapidly, information industry are thriving. The capacity required by software also increases greatly. As a result, the demand for transmission speed of hard disks and computer external electronic devices also grows constantly.

Among the present commercialized transmission products, Universal Serial Bus interface (USB interface for short) and IEEE1394 series products developed by Apple Computer Inc. are the most widely used transmission specifications. In addition to providing signal transmission, they also can provide power supply to an external electronic device. Take the USB interface for instance, each USB interface can provide voltage up to 5 Volts and current up to 500 mA. Hence each USB port can provide 2.5 W of power. However, the present general IDE hard disk of 7200 RPM requires the power of 20 W, a 50×ATAPI CD-ROM requires 10-25 W, a SCSI CD-ROM requires 12 W, a 12×/10×/40×SCSI CD-R/RW requires 20 W, and a 16×ATAPI DVD-ROM requires 10-25 W. Hence the transmission apparatus adopted the present USB interface to provide electricity and signal transmission for hard disks or optical disk drives cannot fully meet the performance requirements of the external products mentioned above. Hence using the USB interface or IEEE1394 series products cannot provide sufficient electric power required. An additional portable transformer has to be prepared to connect the aforesaid external electronic devices. The technique previously discussed has to be upgraded.

Moreover, the new generation of hot-swap SATA hard disk for adopts a new hard disk transmission mode. It is a serial transmission (differs from ATA parallel transmission) at a high frequency (ATA is 33 Mhz, while SATA is 150 Mhz). It also can transmit for a longer distance, consumes less electricity, and uses lower computer power. The hard disk that adopts SATA also has a new power supply mode. As the hard disk consumes less electricity than the ATA type, the temperature is lower. At present SATA on the main stream hard disk still does not fully exhaust ATA transmission speed, its benefits are not fully appreciated. But when the hard disk of a higher speed is developed, its benefits of transmission speed will be significant. In addition to the benefit of higher transmission speed, the SATA transmission line is thinner that the IDE flat cable. The SATA flat cable can reach 100 cm according to the specification. It is more than double the 45 cm of the PATA upper limit. This can improve wiring in the chassis. Moreover, SATA supports plug-and-play function, and is more convenient to couple an external hard disk. However the hard disk or optical disk made according to this specification requires more electric power to reach the original design object.

R.O.C. Patent Publication No. M242774 and No. M245516 disclose a power supply equipped with a power socket to couple with external electronic devices. They can provide sufficient electric power for the external electronic devices. But they cannot provide signal transmission at the same time.

Based on previous discussion, the optimal approach is to provide an apparatus that can integrate power supply and signal transmission, and offer a voltage output required on the external electronic devices. Hence how to directly couple the mainboard and hard disk or external electronic device is an issue remained to be resolved in the industry.

SUMMARY OF THE INVENTION

Therefore the primary object of the present invention is to solve the aforesaid disadvantages. The present invention addresses the problems that have baffled the industry for a long time, such as the external electronic device has to be coupled with the mainboard through a complex wiring and the source of power supply. The invention provides a transmission apparatus which is coupled with a power supply to connect to the power supply and a control signal output device, and integrate in a single connection port. The connection port is coupled with a cable to connect an external electronic device. Users can easily connect the external electronic device through the connection port and the cable. Hence installation of the external electronic device is simpler, easier and costs less.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
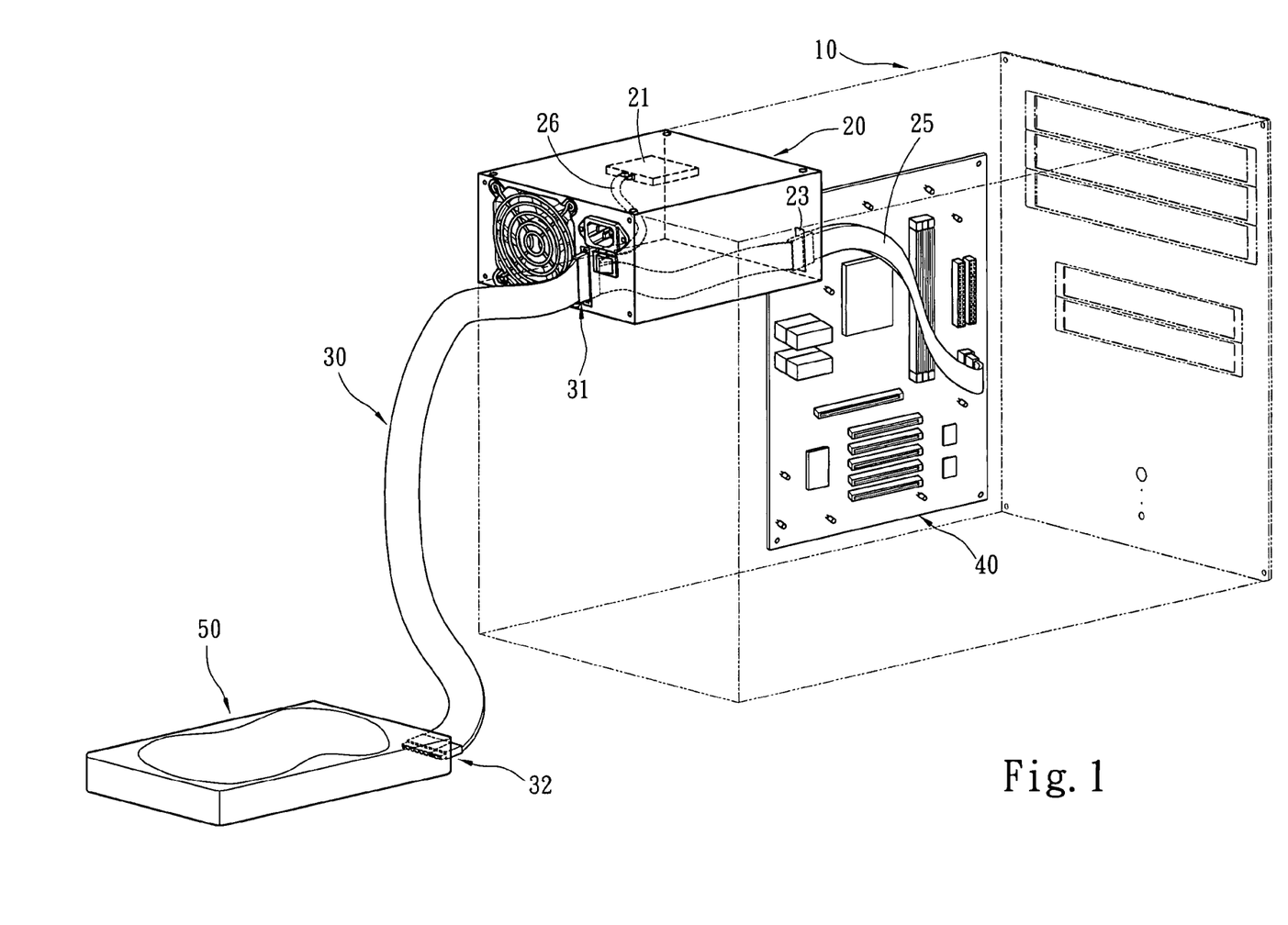
FIG. 1 is a perspective view of the present invention.
Figure 2:
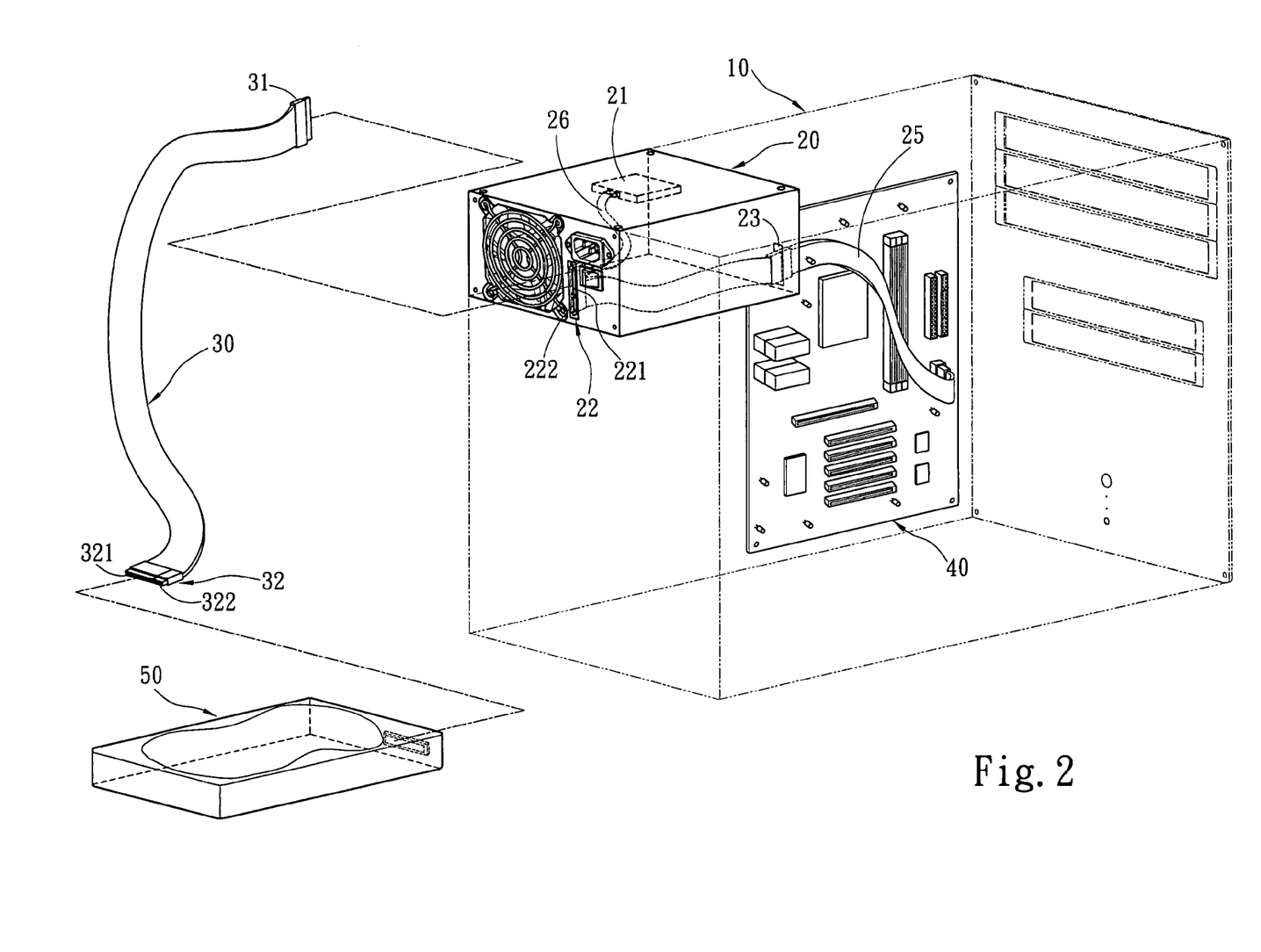
FIG. 2 is an exploded view of the present invention.

Please refer to FIGS. 1 and 2, the signal transmission apparatus for external electronic devices of the invention is to connect electrically an external electronic device 50 to a computer host 10 to provide required electric power and signals. It includes a power supply 20 located in the computer host 10 that provides the required electric power for the external electronic device 50 and the computer host 10. The power supply 20 has a first connection port 22 and a second connection port 23. The first connection port 22 has an electric connector 221 and a signal connector 222. The electric connector 221 is connected to an electric output circuit board 21 of the power supply 20 through an electric transmission line 26. The signal connector 222 is coupled with a signal transmission line 25 which is connected a mainboard 40 of the computer host 10 through the second connection port 23 to transmit control signals. There is an adapter 31 electrically coupled with a signal adapter line 30 connecting to the first connection port 22. The signal adapter line 30 has another end coupled with a coupling head 32 corresponding to an electric port and signal port of the external electronic device 50 (such as an external hard disk). The coupling head 32 has an electric plug 321 and a signal plug 322 to connect to the external electronic device 50.

Figure 3:
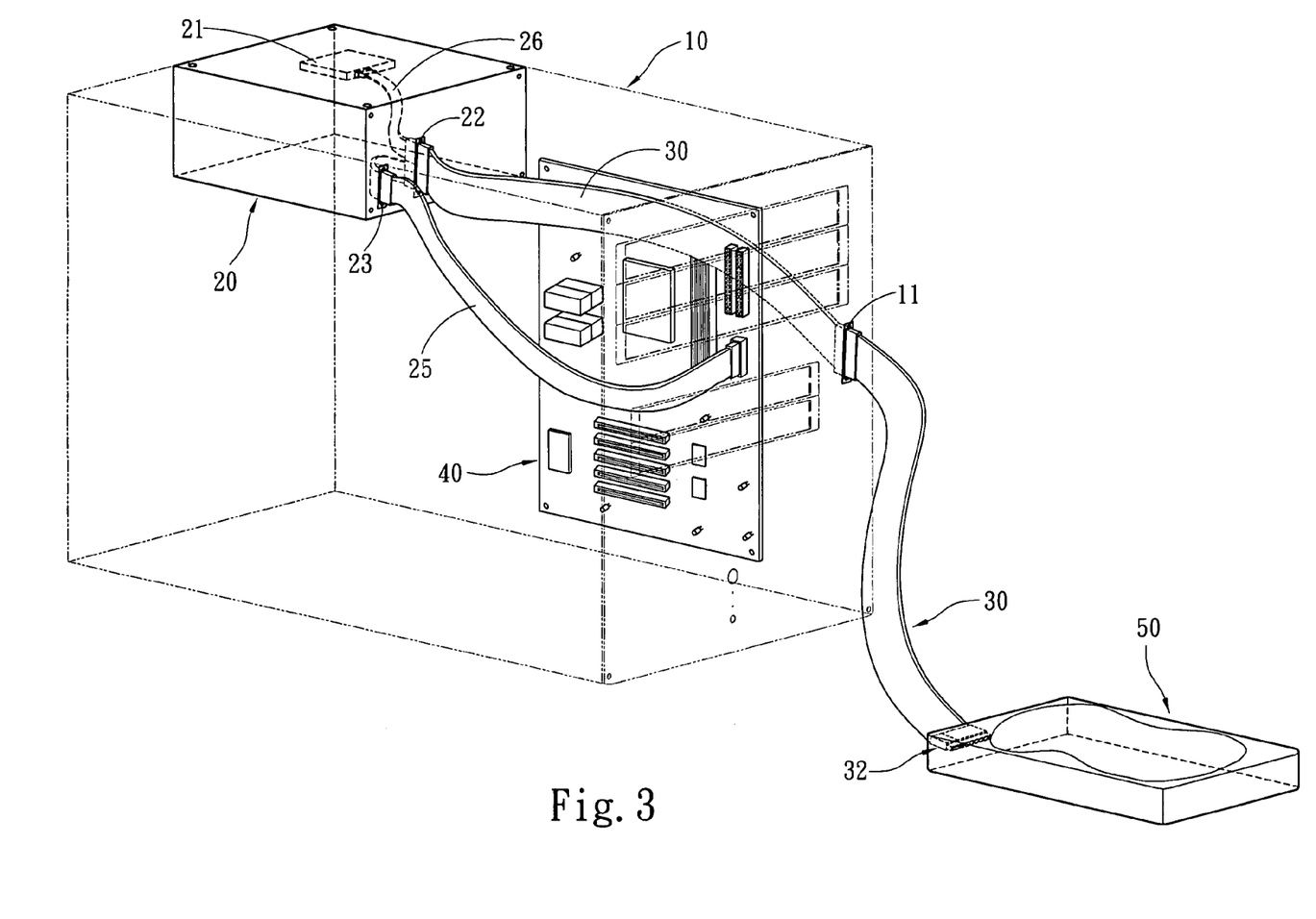
FIG. 3 is a schematic view of the present invention in an assembled condition.

Refer to FIG. 3 for the invention in an assembled condition. The first connection port 22 is located in the power supply 20 inside the housing of the computer host 10. The signal adapter line 30 has one end opposite to the one coupled with the first connection port 22 connecting to a third connection port 11 on the operation face panel of the computer host 10. The third connection port 11 is located on the operation face panel of the computer host 10 where the optical disk drive or floppy disk drive is installed and exposed to facilitate installation of the external electronic device 50. It also may be mounted onto a rear face panel of the computer host 10. Thus the exposed third connection port 11 enables users to easily connect the external electronic device 50.

Figure 4:
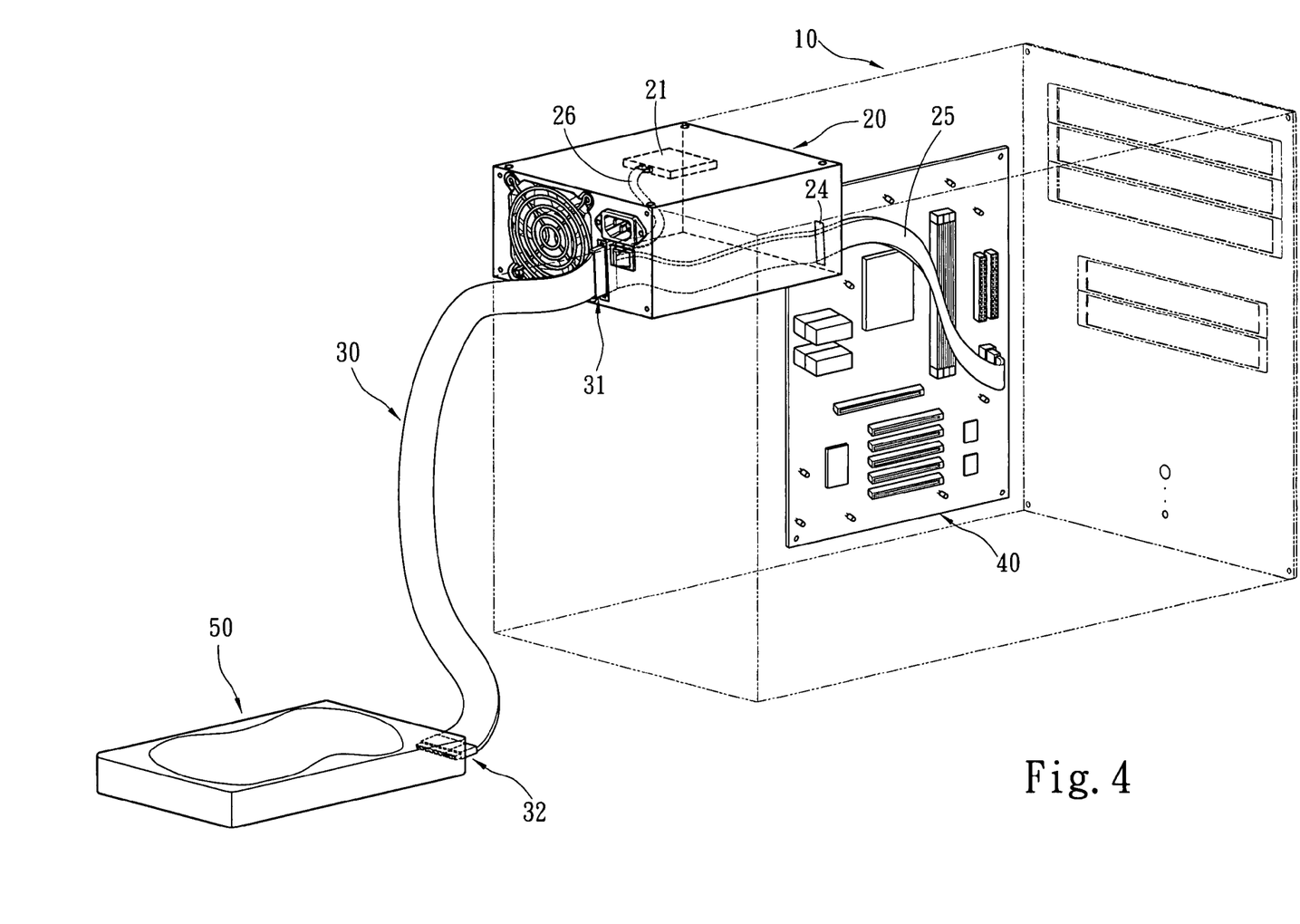
FIG. 4 is a schematic view of the present invention in another assembled condition.

Refer to FIG. 4 for another assembled condition of the invention. The signal transmission line 25 is threaded though an aperture 24 formed on the power supply 20 to connect electrically with the signal connector 222 of the first connection port 22.

Figure 5:
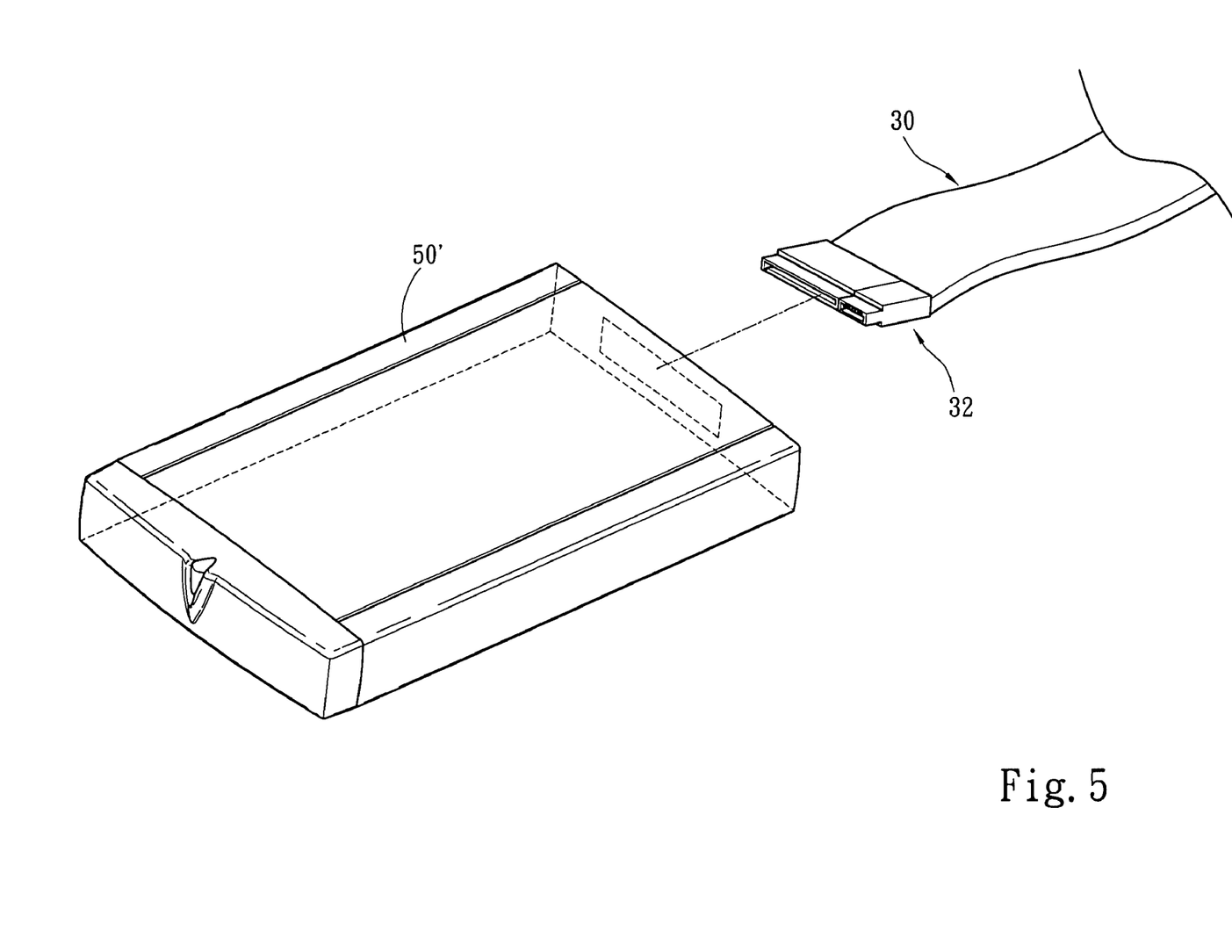
FIG. 5 is a schematic view of an embodiment of the present invention.

Refer to FIG. 5 for an embodiment of the invention. The external electronic device 50 may be an external box 50' of an electronic device or other external electronic device, such as an external optical disk drive or an external floppy disk drive.

Figure 6A:
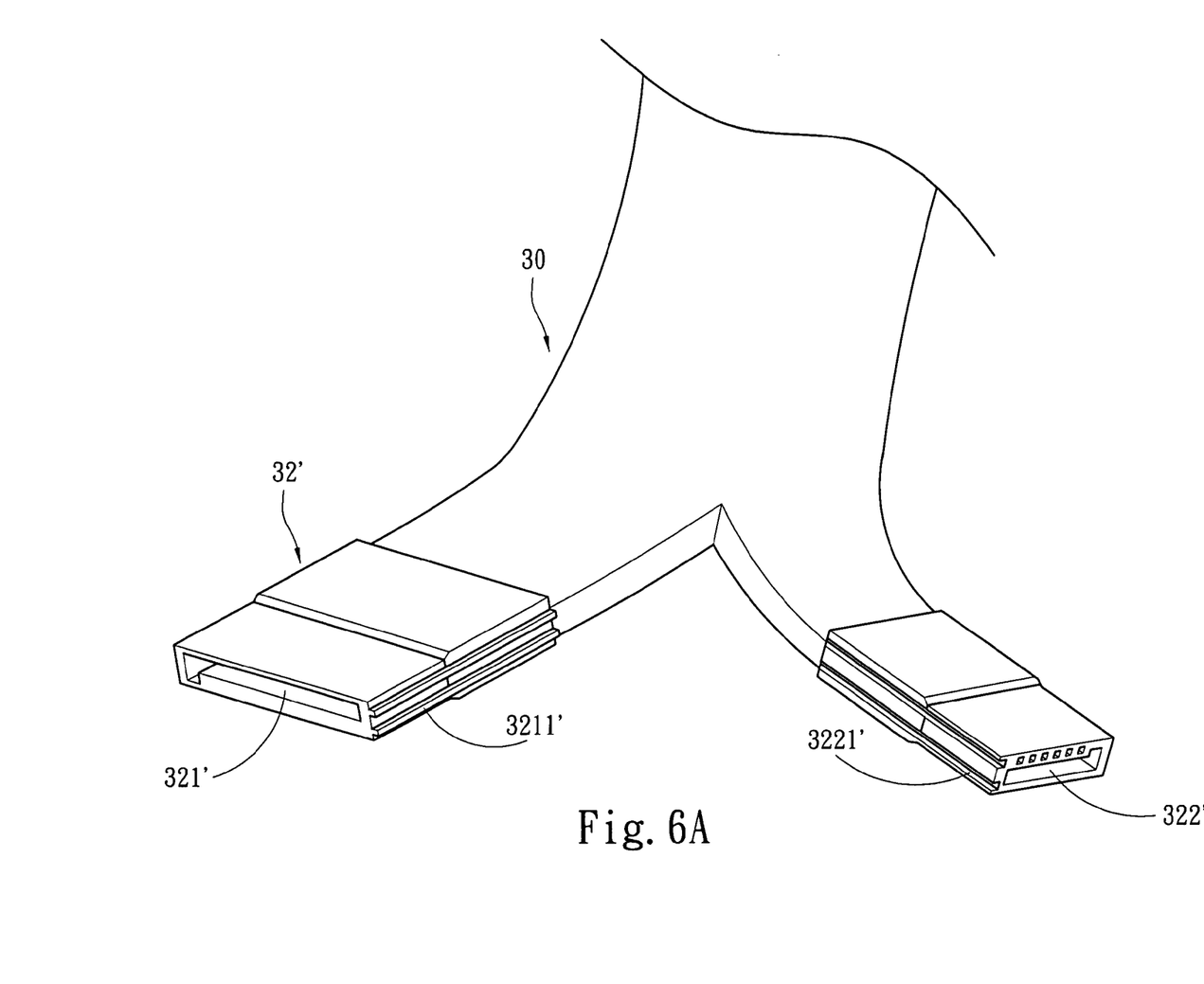
FIGS. 6A and 6B are schematic views of other embodiments of the present invention.
Figure 6B:
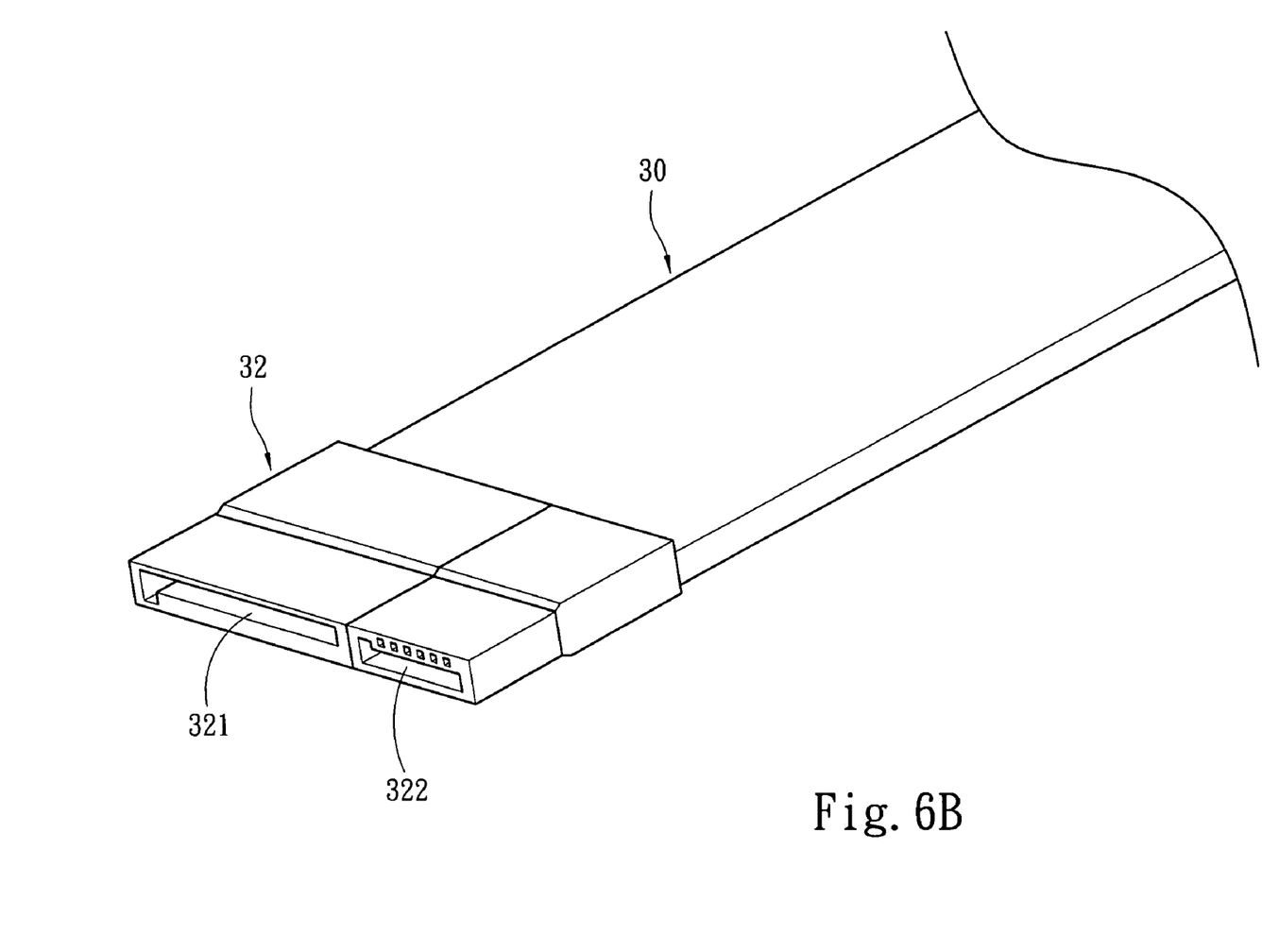

Refer to FIGS. 6A and 6B for another embodiment of the invention. The coupling head 32 includes the electric plug 321 and the signal plug 322 as previously discussed. In another aspect, the coupling head 32' has a first coupling member 3211' on one end where the electric plug 321' is formed, and a second coupling member 3221' on another end corresponding to the signal plug 322'. The first coupling member 3211' and the second coupling member 3221' aim to mate different input and output types to provide the required electricity and signal for the external electronic device 50, and may be disassembled or assembled whenever needed.

Figure 7:
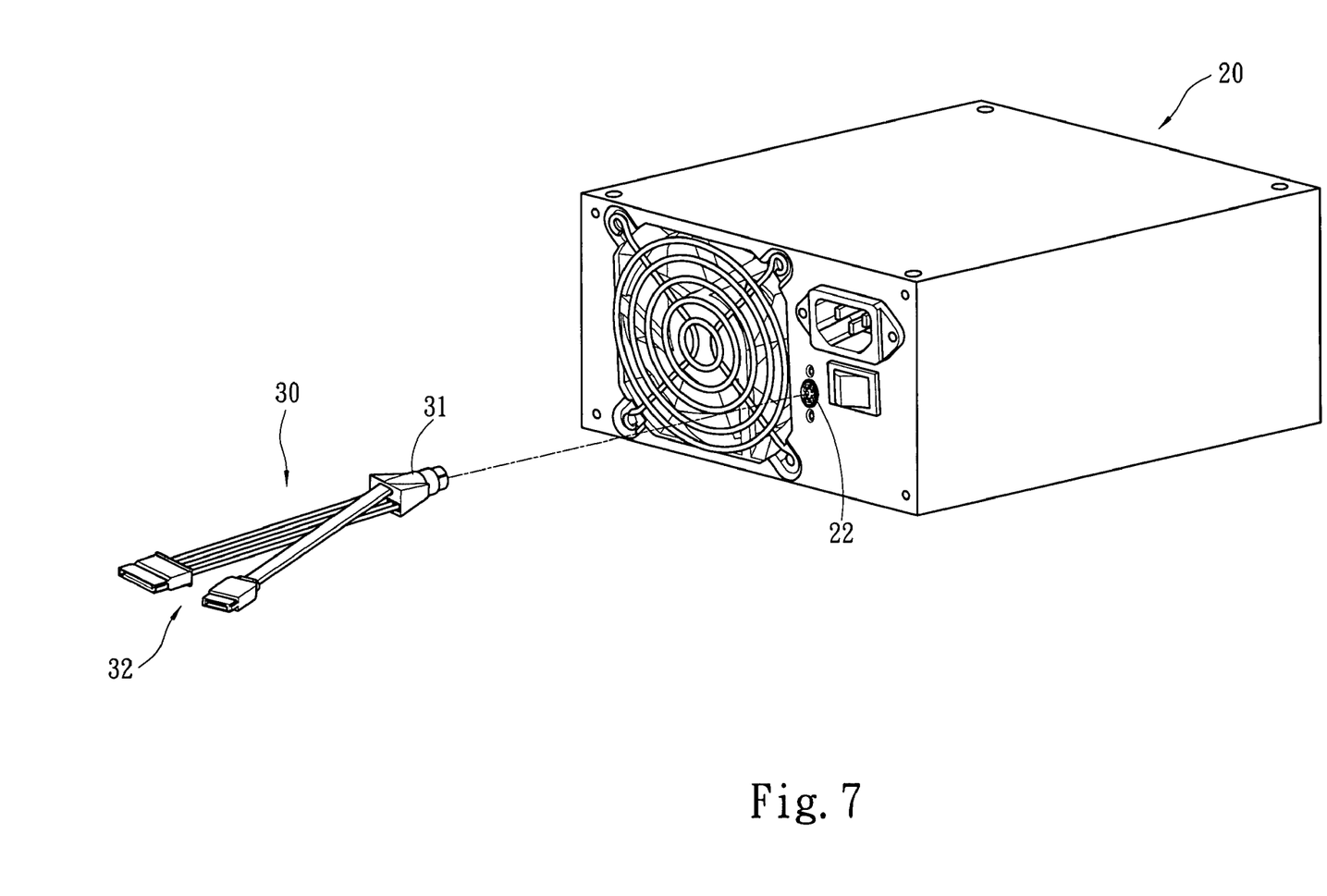
FIG. 7 is a schematic view of yet another embodiment of the present invention.

Refer to FIG. 7 for yet another embodiment of the invention. The adapter 31 of the signal adapter line 30 or the coupling head 32 for coupling with the external electronic device 50 may adopt various existing transmission connectors. The main feature is that the electric transmission line 26 and the signal transmission line 25 are integrated to form the coupling head 32 to facilitate installation of different types of the external electronic device 50.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A signal transmission apparatus for external electronic devices to provide electricity and signals required for an external electronic device which is connected electrically to a computer host, comprising:

a power supply to provide electricity required for the external electronic device and the computer host including a first connection port which has an electric connector and a signal connector, the signal connector being coupled with a signal transmission line to connect to the computer host; and a signal adapter line which has an adapter on one end mating and electrically connecting to the first connection port, and an electric plug and a signal plug on other end corresponding to an electric port and a signal port of the external electronic device.

2. The signal transmission apparatus of claim 1, wherein the first connection port is located on an external face panel of the power supply exposed to a housing of the computer host.

3. The signal transmission apparatus of claim 1, wherein the first connection port is located on the housing of the computer host.

4. The signal transmission apparatus of claim 1, wherein the power supply has a second connection port on the housing of the computer host, the first connection port and the second connection port forming an electric connection through an adapter interface.

5. The signal transmission apparatus of claim 4, wherein the first connection port and the second connection port are jointly located on an internal face panel of the power supply located in the computer host.

6. The signal transmission apparatus of claim 5, wherein the first connection port and the second connection port are located on a same face panel of the power supply.

7. The signal transmission apparatus of claim 1, wherein the first connection port is electrically connected to a third connection port which is for the signal transmission line, the third connection port being located on a housing of the computer host.

8. The signal transmission apparatus of claim 1, wherein the signal transmission line is threaded through an aperture to connect to the first connection port.

9. The signal transmission apparatus of claim 1, wherein the electric plug and the signal plug are coupled to form a coupling head.

10. The signal transmission apparatus of claim 1, wherein the electric plug and the signal plug are separated to form two coupling heads.

11. The signal transmission apparatus of claim 10, wherein the electric plug has a first coupling member, the signal plug has a second coupling member, and the first coupling member and the second coupling member are coupled to form a coupling head which is allowed assembly and disassembly.

12. The signal transmission apparatus of claim 1, wherein the electric plug and the signal plug are located on an external box.

13. The signal transmission apparatus of claim 1, wherein the external electronic device is an external disk drive.

14. The signal transmission apparatus of claim 1, wherein the external electronic device is an external optical disk drive.

* * * * *